Dec. 31, 1935.　　　　J. N. MAHONEY　　　　2,026,351
FLUID BRAKING SYSTEM
Filed Oct. 12, 1931
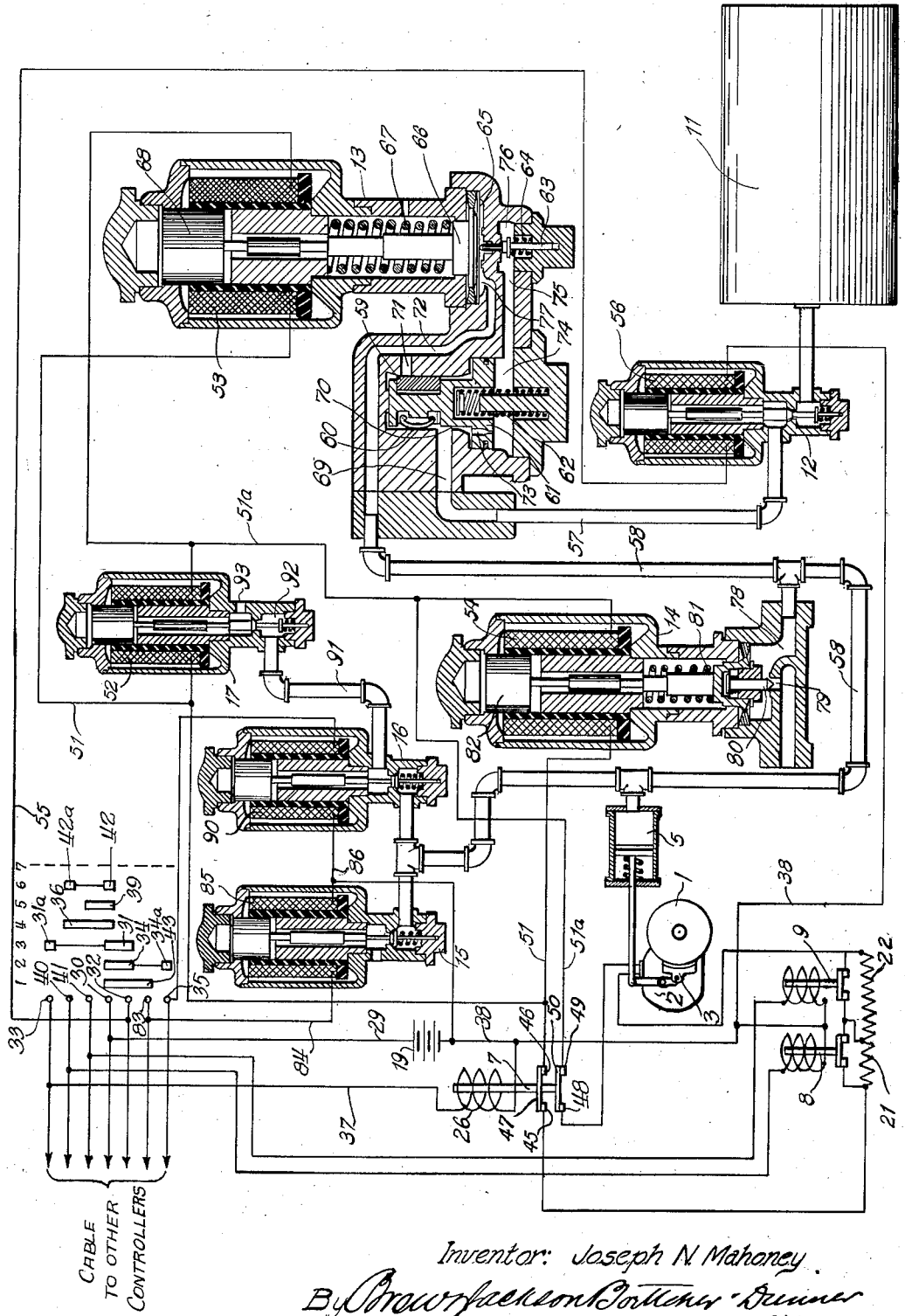
Inventor: Joseph N. Mahoney
By Brown Jackson Bottner Bruner
Attys.

Patented Dec. 31, 1935

2,026,351

UNITED STATES PATENT OFFICE 2,026,351

FLUID BRAKING SYSTEM

Joseph N. Mahoney, Brooklyn, N. Y., assignor of one-half to H. E. Bucklen, Elkhart, Ind.

Application October 12, 1931, Serial No. 568,227

13 Claims. (Cl. 303—21)

My invention relates to electrically controlled fluid-pressure braking systems of general application in single car units or multiple car trains which are adapted to be controlled from a single point or station. The invention is applicable to railways either street or elevated, to railroads, trucks and trailers, busses and the like.

The object of my invention is to improve the action of fluid-pressure vehicle brakes by providing means for producing a substantially uniform retardation at a maximum or a lesser rate, that shall be simple and durable in construction, reliable in operation and automatically dependent upon the speed of the vehicle at the moment of application and during the braking period.

In order to bring a vehicle or train of vehicles to rest in a minimum length of time from speeds that differ widely, it is desirable to make the initial application of fluid-pressure to the brake cylinders dependent upon the speed at which the vehicles are running when the brakes are applied.

When a vehicle is equipped with means for accomplishing this result, it is obvious that very heavy pressures will, in some cases, be applied to the brakes, and if this initial pressure is maintained as the vehicle decreases in speed, a point will be reached at which the wheels will be locked by the brake shoes and will slide. In order to secure the advantages of the relatively high initial pressure and also to avoid the aforesaid disadvantages it is necessary to provide means for automatically decreasing the applied pressure as the speed of the vehicle is decreased.

I am aware that braking systems exist which, by reason of their fundamental characteristics, vary the pressure between the brake shoes and the wheels as the speed varies, such as electromagnetically applied brakes that are energized from a dynamo-electric machine which is carried on the vehicle and which is driven by means of its momentum, but these systems have many disadvantages which do not appear in fluid-pressure braking systems, and, so far as I am aware, neither the automatic regulation of the initial application of the pressure applied to the braking cylinder nor the combination of this feature with the automatic regulation of the pressure during the braking period have heretofore been accomplished.

Assuming that a substantially constant retardation is secured at a maximum rate, which is consistent with the safety and comfort of the vehicle passengers, or at lesser rate, it is still further desirable to modify the final braking action in order to avoid a jolting or reverse action which is usually felt just as the vehicle is brought to rest.

The single figure of the accompanying drawing is a diagrammatic view of a fluid braking system which is arranged in accordance with my invention and which is adapted to effect the objective results hereinbefore indicated.

Referring to the drawing, a vehicle wheel 1, that is provided with an electric generator 2, is equipped with brake 3 which is adapted to make frictional engagement with the wheels when fluid-pressure is supplied to a brake-actuating cylinder 5. This wheel may be one of the wheels of a railway truck, or it may be a motor bus or truck wheel. And while a single wheel is shown, it is to be understood that any number of wheels may be employed as required. The brake shoe 3 will of course correspond to the type of wheel used, and the shoe shown is for illustration only.

Fluid-pressure is supplied from a storage tank 11 through a plurality of electrically controlled magnet valves comprising a manual application valve 12, and an automatic application valve 13; and may be partially released through an automatic release valve 14, and fully released by a manual release valve 15 and a manual final release valve 16, the latter of which is controlled by an automatic final release valve 17. The action of the manual valves is dependent upon the position occupied by a braking controller 18 and energy may be supplied for the operation of the control switches 7, 8, and 9 and the magnet valves 12, 15, and 16, from any convenient source, such as a battery 19.

The generator 2 may be conveniently designated as the braking control generator and is preferably of a type having a constant field, such as for example permanent magnets. The rotor of the generator is connected to the wheel 1 or its axle to be moved thereby at a speed directly proportional to the speed of rotation of the wheel. The voltage generated by this generator therefore is directly proportional to the speed of the wheel.

The relay 7, which may be termed the control relay, is arranged to open and close the circuit of the generator 2 to thereby control the application of current from that generator to the electropneumatic control devices, as will presently appear. When the relay 7 is energized, the generator circuits through it are opened and no braking control is exercised. The circuit of relay 7 may be extended through the power application control of the vehicle to hold that relay energized when motive power is being expended to drive the vehicle to thereby insure that the brakes will not be applied while motive power is on.

The braking devices of my invention are controlled through a braking controller 18, which may be any one of the several controller mechanisms now commercially available. As shown, the controller consists of stationary contact fingers to which the circuit connections are made, and a movable drum containing contacting inserts which connect the contact fingers together in various combinations as required. The drum is shown as having 7 positions, but this number may be varied within the teachings of my invention.

When the relay 7 is in its lower position, the terminals of the generator 2 are connected through contact terminals 45 and 46 (which are bridged by a contact member 47) and contact terminals 48 and 49 (which are bridged by a contact member 50) to conductors 51 and 51a, across which the respective magnet windings 52, 53, and 54 of the valves 17, 13, and 14 are connected in multiple circuit. The magnet windings 52, 53 and 54 will receive energy from the generator 2 by reason of the momentum of the car. The circuit from the generator extends through resistors 21 and 22 which are controlled by relays 8 and 9, to regulate the energy delivered to the valves. The amount of energy received by the coils 52, 53, and 54 will obviously be proportional to the speed of the generator during the braking period, and equal to the output of the generator when resistors 21 and 22 are short circuited.

Assuming that braking controller 18 occupies position 3, energy is supplied from the battery 19 through conductor 29, contact finger 30, which is engaged by contact segment 31, contact finger 32, also engaged by segment 31, conductor 55 to magnet winding 56 of the manual application valve 12, from which point the circuit is completed through the negative battery conductor 38. The magnet winding 56, when energized, holds the valve 12 closed in opposition to the fluid-pressure existing in the tank 11 and, consequently, no fluid-pressure can be admitted to the brake cylinder.

Simultaneously a circuit is closed from the contact finger 30 and segment 31, through segment 31a and contact finger 33 engaged thereby, through conductor 37 and winding 26 of relay 7 to the negative battery conductor 38. Relay 7 is energized over this circuit and raises contact members 47 and 50 to open the circuit of generator 2. Position 3 of the controller 18 may therefore be termed the running position of the braking system since, when the controller is in this position, application of the brakes is definitely prevented.

When the braking controller 18 is moved to position 4, 5, 6 or 7, the contact fingers 32, 32 and 33, will be disengaged from the contact segments 31 and 31a and the magnet winding 56 and relay winding 26 will be deenergized. The pressure in the storage tank 11 is now sufficient to open the valve 12 and the fluid-pressure will be admitted from the tank through pipe 57, automatic valve 13, as hereinafter explained, and the pipe 58 to the brake cylinder 5.

The automatic admission valve 13 consists of a set of supply parts which control the flow of air through the valve and a set of regulating parts which automatically determine the pressure of the fluid admitted to the brake cylinder. The supply apparatus comprises a supply valve 59 which is seated by a spring 60, a supply valve piston 61 and a spring 62 therefor which tends to hold the supply valve 59 in its closed position. The regulating apparatus comprises a regulating valve 63, a regulating valve spring 64, a diaphragm 65, a diaphragm spindle 66, a regulating spring 67 and a regulating magnet 68 which is provided with the winding 53 and which acts in conjunction with the spring 67. The action of the valve is as follows:—Fluid pressure enters through a passage 69 to the supply valve chamber 70 and moves supply valve piston 61 in opposition to spring 62 to cause supply valve 59 to open port 71. Fluid-pressure is thus admitted to the pipe 58 and also through passage 72, against the diaphragm 65. As already explained, the degree of energization of the magnet winding 53 is dependent upon the speed of the generator 2, consequently, if this speed is relatively slow when the brakes are applied, the pressure of the spring 67 will be exerted against the diaphragm 65 practically unassisted. On the other hand, if a vehicle is running at a relatively high speed when the brakes are applied, a considerable force will be applied by the magnet 68 which will be added to the pressure exerted by the spring 67. By reason of the spring pressure, the regulating valve 63 is normally open but as soon as sufficient fluid-pressure is admitted through the port 71 and the passage 72 to counterbalance the joint pressure of the spring 67 and the magnet 68, the regulating valve will be closed by the spring 64. When fluid-pressure is admitted through port 71 it also passes through a small port 73 in the piston 61 to a chamber 74 and through a passage 75 to a regulating chamber 76. As the regulating valve 63 is opened, fluid-pressure is also supplied to diaphragm chamber 77 and when the pressure supplied to the pipe 58, which corresponds to that existing in the diaphragm chamber 77, exceeds the combined pressures of the regulating spring 67 and the magnet 68, the diaphragm will yield and allow the regulating valve 63 to close, thereby cutting off any further flow from the chamber 74. As the fluid which continues to flow through the small port 73 will equalize the pressure on both sides of the piston 61, the port 71 will be closed by reason of the action of the spring 62.

The fluid-pressure admitted to the brake cylinder is thus automatically dependent upon the speed of the vehicle at the moment of application up to the maximum pressure which exists in the storage tank. In adjustment of the valve, the pressure exerted by the spring 67 will usually correspond to the maximum fluid-pressure which may safely be admitted to the brake cylinder under slow speed conditions of operation, and in this way, very much higher pressure may be maintained in the storage reservoir than may be admitted under such conditions to the brake cylinder, and in cases when the brakes are applied to the vehicle while it is operating at relatively high speeds the pressure admitted to the brake cylinder may be materially increased.

If these relatively high initial pressures were maintained in the brake cylinder after the speed of the vehicle had materially decreased, the coefficient of friction between the brake shoes and the wheels would be increased to such an extent that the wheels would be locked and would slide. In order to avoid undesirable results of this kind an automatic release valve 14 is provided.

This valve comprises a port 78 to which is connected the pipe 58, an exhaust port 79 which is normally closed by a valve 80, a spring 81, and a magnet 82 which acts in conjunction therewith to hold the valve 80 closed. When the pressure existing in the braking cylinder 5 and the pipe 58 exceeds a predetermined amount, the valve 80 will be raised in opposition to the pressure of the spring 81 and the magnet 82 so that fluid will be allowed to escape through the exhaust port 79 until the pressure is sufficiently reduced to permit the valve to close. Since the winding 54 of the magnet 82 is energized from the generator 2, the pressure tending to hold the valve 80 closed, is dependent, above a predetermined amount, upon the speed of the vehicle during the braking period and by this means the pressure in the cylinder is automatically reduced as the speed of the vehicle decreases.

It will be observed that the release valve 14 is only active when the pressure in the brake cylinder exceeds a predetermined amount, dependence being put upon the manual release magnet 15 or upon the automatic final release magnet 17 in conjunction with the manual release magnet 16 to reduce the pressure in the brake cylinder to a small amount or to zero, according to the prevailing conditions.

When the braking controller occupies a position in which the brakes are applied and it becomes desirable to immediately release the brakes, the controller 18 may be moved to the position 1 in which position energy is supplied from the battery 19 through conductor 29, contact finger 30, contact segment 43, a contact finger 83 and conductor 84 to a magnet winding 85 of the valve 15, from this point a circuit is completed through a conductor 86 and the negative conductor 38. The magnet winding 85, when energized, serves to open the valve 15 in opposition to the pressure existing in the brake cylinder and the pipe 58, so that the fluid escapes through the exhaust port 87 and the brakes are released.

If it is desirable to bring the vehicle to rest, the vehicle driver may move the braking controller 18 to position 2 to effect a relatively constant retardation in which position energy will be supplied from one terminal of the battery 19 through conductor 29, contact finger 30, contact segment 34, contact segment 34ª, contact finger 35 and conductor 89 to the actuating magnet winding 90 of the valve 16. The winding 90, when energized, opens the valve 16 in opposition to the fluid-pressure existing in the brake cylinder 5 and pipe 58 and the existing fluid-pressure is allowed to pass through pipe 91 into the chamber 92 of the automatic final release valve 17. Simultaneously the circuit of magnet 56, extending through conductor 55 to contact finger 32, is closed by contact segment 34, and valve 12 is operated thereby to prevent entrance of more fluid into the brake cylinder 5. As hereinbefore explained, the magnet winding 52 which controls this valve 17 is energized from the generator 2, so that the pressure tending to hold the valve closed will be dependent upon the speed of the vehicle. As this speed is decreased to a very low value, such as two miles per hour, by reason of the application of brakes, the fluid-pressure in the chamber 92 will open the valve and escape of pressure at a definite rate will occur through an exhaust port 93 until the pressure exerted by the magnet again exceeds the fluid-pressure. In this way, the fluid-pressure in the brake cylinder at the final portion of the stop will be gradually brought to zero as the vehicle is brought to rest and the final braking action modified to avoid the jolting or reverse action usually felt as the vehicle is brought to rest.

In certain instances the vehicle driver may desire to reduce the speed of the vehicle at a rate less than maximum. This may be done by moving the controller 18 to position 4, 5, or 6. In position 4, segment 36 connects one terminal of battery 19 to contacts 40 and 41, thereby completing the circuits of relays 8 and 9 which are energized. The energization of these relays removes the short circuits from around resistors 21 and 22, and the resistance of those units is therefore placed in series with the magnet 53 of automatic admission valve 13 and magnets 54 and 52 of automatic release valves 14 and 17. The current delivered to these valves by the generator 2 is thereby reduced and, regardless of the speed of the vehicle, maximum pressure will not be admitted to the brake cylinder 5. Rather, the pressure admitted will be proportional to the vehicle speed as before. Since all the resistance is in circuit, the braking pressure will be a predetermined minimum relative to the speed.

In position 5 the controller 18 sets segment 39 in engagement with contact fingers 30 and 41 to close the circuit of relay 9. This relay is energized to remove the short circuit from resistor 22, thereby placing that resistance in series with the magnets of valves 17, 14 and 13. Preferably the resistors 21 and 22 are of ohmic values of a ratio of 2 units in 22 and 1 unit in 21. Then when both resistors are in series with the valves, 3 units of resistance are in circuit with them. When resistor 22 is alone in series with the magnets of the valves, 2 units are in series with them. The reduction of current delivered by the generator at a given speed to the valves is less when but two units of resistance are in the circuit, and the pressure admitted to the cylinder 5, while less than maximum, is larger than when the controller is in position 4.

Similarly, in position 6 the controller 18, through segment 42 and 42ª connects battery through contact finger 40 to complete the circuit of relay 8 and that relay is energized to connect the resistor 21 in series with the valves. Thus one unit of resistance is placed in series with the magnets and the pressure admitted to cylinder 5 is increased to another point below maximum.

While I have characterized the values of resistors 21 and 22 as 1 unit and 2 units respectively, I do not mean to infer that these resistances are 1 ohm and 2 ohms respectively. The actual ohmic values will depend upon the constants of the circuit such as voltage generated by 2 and resistance values of magnets 53, 52, etc., and resistors 21 and 22 are to be of the ratio of 1 to 2.

In position 7 of the controller 18, all contact fingers are in engagement with insulation and no circuits are closed through them. Relays 7, 8, and 9 are deenergized and consequently the full voltage of the generator 2 is delivered to windings of valves 13, 14, and 17. Automatic application valve 13 is operated to admit maximum pressure to the brake cylinder, dependent of course upon the speed at which the wheel is turning. Maximum retardation is therefore secured under these conditions.

The automatic final release feature may or may not be employed in connection with the automatic admission regulator, and various other modifications may be effected within the scope of my invention.

In the foregoing description only one car or vehicle has been considered. In installations in which a plurality of cars are coupled to form a train, each car will be equipped in the above manner and the functioning of the individual equipment is as described. The manual control of such equipment is centralized to one unit 18 which may be located in any one of the several cars. The control conductors 55, 37, 84, 89, etc., are multiplied from car to car, as indicated by the arrows on these conductors. The manner of such interconnecting of the units is usual and well understood by those skilled in the art, and need not be further discussed herein.

While I have chosen to illustrate and describe a preferred embodiment of my invention, I have done so by way of example only and I am, therefore, to be limited only by the scope of the appended claims.

I claim as my invention:—

1. In a fluid braking system, the combination with a rotatable member, and a member making frictional engagement therewith, of means dependent upon the speed of the rotatable member for automatically regulating the maximum initial pressure between said members, means comprising a plurality of electrical resistant units associated with said last-named means for causing regulation to an initial pressure below maximum, and means for automatically reducing the pressure between said members as the speed of the rotatable member is reduced.

2. In a fluid braking system, the combination with a movable member, and a relatively stationary member that may engage said movable member, of means for establishing such frictional engagement between the movable and the relatively stationary members that the maximum initial pressure between the members shall be automatically regulated and dependent upon the speed of the movable member at the time when the engagement is established, means for automatically reducing the maximum pressure between said members as the speed of the movable member is reduced, and selective means in addition to and separate from said last-named means for automatically reducing the pressure between said members from maximum to zero at a rate proportional to the speed of said movable member.

3. In a fluid braking system, the combination with a movable member, a relatively stationary member that shall engage said movable member, a fluid pressure actuating cylinder therefor, and an application and a release valve for said cylinder, of means dependent upon the speed of the movable member for regulating the fluid-pressure admitted to the cylinder when said application valve is operated, a final release valve, and means dependent upon the speed of the movable member during the braking period for automatically regulating said final release valve.

4. In a fluid braking system, the combination with a rotatable member, a relatively stationary member that shall engage said rotatable member, a fluid-pressure actuating cylinder therefor, a single manual control means for said system to effect service and emergency operation thereof, and an application and a release valve for said cylinder, of automatic means dependent upon the speed of the rotatable member for regulating the fluid-pressure admitted to the cylinder when said application valve is operated for a service application of the brakes, and means dependent upon the speed of the movable member during the braking period for automatically regulating the release valve.

5. In a fluid-pressure vehicle braking system, the combination with an application valve, and an electrically governed automatic application valve therefor, of means dependent upon the speed of the vehicle at the moment of application for automatically varying the voltage applied to the valve magnet, and manually selectable means for reducing said voltage.

6. In a fluid-pressure vehicle braking system, the combination with a dynamo-electric machine that is driven by the motion of the vehicle, an application valve, and an electrically governed control valve therefor, of means dependent upon the speed of the vehicle at the moment of application for automatically varying the voltage applied to the valve magnet comprising an electric circuit controller through which the valve magnet is connected to said dynamo-electric machine, and separate means for reducing said voltage.

7. The combination with a vehicle and a fluid-pressure braking system therefor, of an application valve for said system which automatically admits a predetermined minimum pressure and admits higher pressures that are dependent upon the speed of the vehicle at the instant of application, a release valve which is automatically dependent upon the speed of the vehicle above a predetermined minimum pressure and below which it is inactive, and a final release valve which gradually and automatically reduces the pressure from said predetermined minimum to zero as the speed is finally retarded.

8. In a braking system for vehicles, the combination with a source of fluid-pressure, an application cylinder, an application valve which limits the pressure admitted to the cylinder, an excess pressure release valve and a final release valve, of means dependent upon the speed of the vehicle at the moment of application for varying the limit fixed by the admission valve, means for automatically regulating the pressure release valve to reduce the initial pressure to a predetermined value as the speed is retarded, and means for automatically and gradually regulating the final release valve so that the pressure is reduced to zero as the speed is finally retarded.

9. In a vehicle, the combination with a fluid-pressure braking system comprising a source of fluid-pressure, a braking cylinder and brakes, of means for applying the brakes at a pressure which automatically varies above a predetermined amount according to the speed of the vehicle at the moment of application, means for reducing the applied pressure to a predetermined amount as the speed is retarded, and means for automatically reducing the pressure to zero as the speed is finally retarded.

10. A car brake having a controlling power generator driven by momentum of the car and adapted to furnish power diminishing in intensity as the speed of the car diminishes, automatic means for varying the braking pressure throughout the period of a braking operation in relation to the speed of the car to thereby increase the efficiency of the braking operation, and means under the control of the operator, by which he may at will vary the rate of automatic retardation.

11. In a fluid pressure vehicle braking system, a friction brake, a braking cylinder, a source of fluid supply, an automatic application valve, an automatic release valve, an automatic final release valve, and means dependent upon the speed of said vehicle for automatically regulating said application and said release valves.

12. The combination with a fluid-pressure braking system for vehicles comprising a source of fluid-pressure, a braking cylinder, and brakes, of an automatic application valve for applying pressure from said source to said cylinder, means for automatically controlling said valve to limit the pressure initially applied proportionally to the speed of the vehicle, and means for further controlling said valve to limit the pressure applied at any speed to a selected value below maximum for that speed.

13. The combination with a fluid-pressure braking system for vehicles comprising a source of fluid-pressure, a braking cylinder, and brakes, of an automatic application valve for applying pressure from said source to said cylinder, means for automatically controlling said valve to limit the pressure initially applied proportionally to the speed of the vehicle, means for further controlling said valve to limit the pressure applied at any speed to a selected value below maximum for that speed, and automatic means for reducing said applied pressure as the speed of the vehicle is reduced.

JOSEPH N. MAHONEY.